United States Patent [19]

Toyota

[11] 4,251,151
[45] Feb. 17, 1981

[54] APPARATUS INCLUDING BATTERY CHECK CIRCUIT

[75] Inventor: Kenji Toyota, Kawasaki, Japan

[73] Assignee: Nippon Kogaku K.K., Tokyo, Japan

[21] Appl. No.: 937,911

[22] Filed: Aug. 30, 1978

[30] Foreign Application Priority Data

Sep. 13, 1977 [JP] Japan ............................ 52/122361[U]

[51] Int. Cl.³ .................... G03B 7/26; G01N 27/46
[52] U.S. Cl. ................................ 354/60 L; 340/636
[58] Field of Search .............. 354/53, 60 E, 60 L, 354/60 R, 289; 352/170, 171; 340/636, 663; 324/29.5; 307/85

[56] References Cited

U.S. PATENT DOCUMENTS

| 3,486,428 | 12/1969 | Fukushima | 354/60 X |
| 3,947,855 | 3/1976 | Inoue et al. | 354/60 L |

Primary Examiner—L. T. Hix
Assistant Examiner—William B. Perkey
Attorney, Agent, or Firm—Shapiro and Shapiro

[57] ABSTRACT

An apparatus for checking the voltage applied to one or more electrical circuits provided on a substrate comprises a pair of power supply terminals respectively connected to each of the electrical circuits, a means for applying a voltage between the power supply terminals, a manually operable power switch means provided between the voltage applying means and one of the power supply terminals and a battery check device. The battery check device includes a battery check circuit provided on the substrate and connected between the power supply terminals. The battery check circuit is adapted to detect the voltage applied between the power supply terminals and to provide a detection signal indicating the result of the detection. The battery check device further includes a display means connected to the battery check circuit and adapted to indicate the detected voltage level in response to the detection signal. The apparatus comprises further a battery check switch means connected to the battery check device and adapted to actuate the device upon the closure of the switch means and a link means provided in such a manner as to close the power switch means in response to the closure of the battery switch means and irrespective of aforementioned manual operation.

8 Claims, 4 Drawing Figures

APPARATUS INCLUDING BATTERY CHECK CIRCUIT

BACKGROUND OF THE INVENTION

1. Field of the Invention

The present invention relates to an apparatus including a battery check circuit.

A battery check circuit is a circuit for detecting and indicating if a power supply battery has a normal voltage in order to assure that an electric circuit included in an apparatus, for example a camera, is capable of performing a normal function. It is spacewise and costwise advantageous to incorporate such battery check circuit into an integrated circuit element which includes a light-measuring circuit and a control circuit for the camera. However, as the number of external terminals of such integrated circuit element is limited, it is desirable that the power supply terminals for said battery check circuit can be used also as the power supply terminals for the above-mentioned other circuits.

2. Description of the Prior Art

FIG. 1 shows a conventional apparatus provided with power supply terminals used in common for both circuits, wherein a main circuit 2 comprising a light-measuring circuit, control circuit, etc, for a camera and a battery check circuit 3 constitute an integrated circuit provided on a substrate 1, said circuits 2 and 3 being connected to a power switch S1 and a power supply battery 5 through common power supply terminals 4a, 4b. Also connected to said battery check circuit 3 are a battery check switch S2 through terminals 6, 7 and a display element 8 through a terminal 9. Such arrangement is inconvenient for actuating the battery check circuit 3 since the battery check circuit can be operated only after the power switch S1 for the main circuit is closed. For example in case of a camera wherein the power supply switch to the light-measuring circuit, etc., is closed by pulling out a film winding lever, the battery check switch can be operated only after said winding lever is pulled out by a predetermined angle.

SUMMARY OF THE INVENTION

The object of the present invention, therefore, is to provide an apparatus provided with power supply terminals utilized in common for the battery check circuit and for the main circuit such as light-measuring circuit, etc., and which allows the battery check circuit and the main circuit to be actuated independently of the position of the main power switch, with one switch operation.

DESCRIPTION OF THE PREFERRED EMBODIMENTS

In the following there will be given an explanation on a first embodiment of the present invention shown in FIG. 2.

Figure 1:
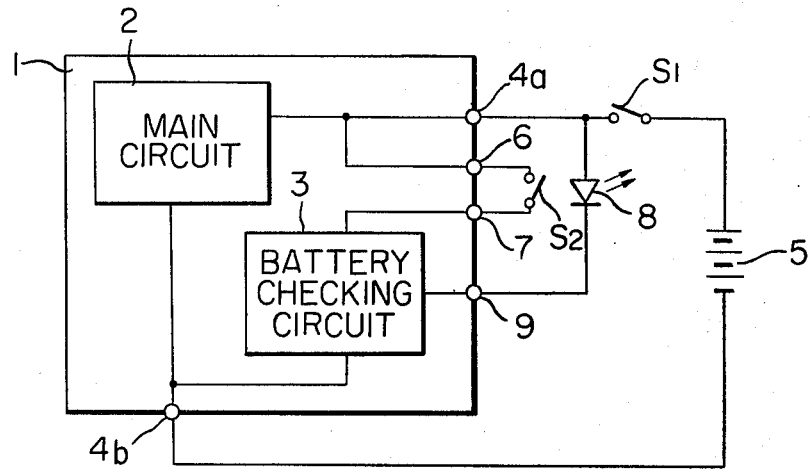
FIG. 1 is a circuit diagram of an apparatus including a conventional battery check circuit.
Figure 2:
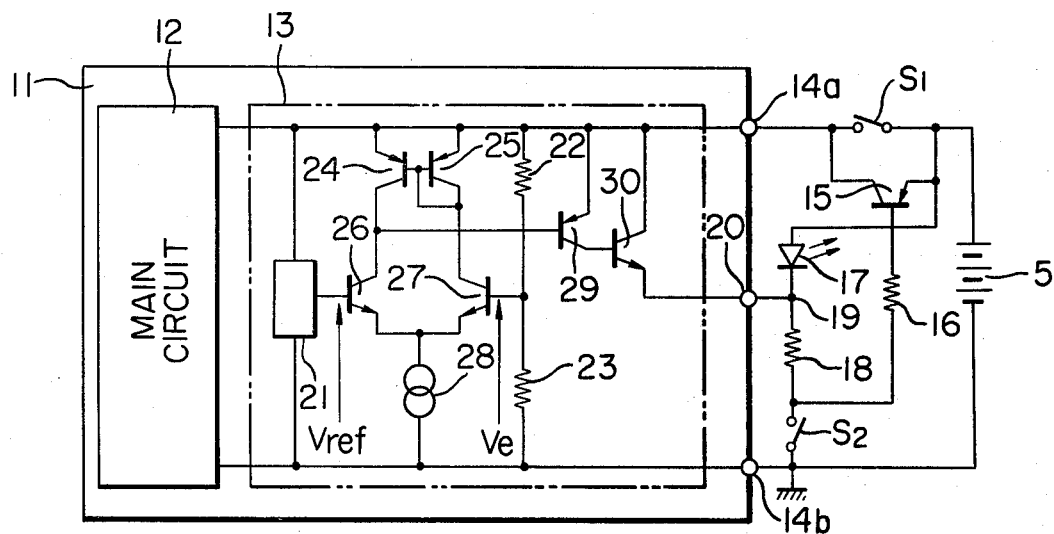
FIG. 2 is a circuit diagram of a first embodiment of the apparatus including a battery check circuit of the present invention.

FIG. 2 shows a circuit diagram including a main circuit such as a light-measuring circuit, etc., for a camera and a battery check circuit. Both circuits are provided on a substrate 11, wherein the power supply lines of said battery check circuit 13 and main circuit 12 are commonly connected to power supply terminals 14a, 14b which are in turn connected through a power switch S1 to a battery 5. Said power switch S1 is structured to be closed for example by pulling out a film winding lever (not illustrated) by a determined angle. A transistor 15 is connected, through the emitter and collector thereof, in parallel with the power switch S1, while the base of said transistor is grounded through a resistor 16 and a battery check switch S2. There is provided a light-emitting diode (LED) 17 for battery check display of which anode is connected to the positive power supply line while the cathode is grounded through a resistor 18 and the battery check switch S2. The junction 19 between the resistor 18 and the light-emitting diode 17 is connected to an output terminal 20 of the battery check circuit 13, whereby the light-emitting diode 17 is turned on and off under the control of said battery check circuit 13, which is composed of a differential amplifier consisting of a standard voltage source 21, voltage-dividing resistors 22, 23, transistors 24, 25, 26, 27 and a constant-current source 28, and output transistors 29, 30.

The function of the battery check circuit is as follows. In a battery check operation, the battery check switch S2 is closed while the power switch S1 is maintained open, whereby the transistor 15 is turned ON to allow current flow between the emitter and collector, thus feeding the power supply line. At the same time a series circuit comprising the light-emitting diode 17 and resistor 18 is connected between the power supply lines. The on-off function of said diode 17 is controlled by the battery check circuit 13 through the output terminal 20 thereof. The voltage of the power supply line, or the battery, is divided by the resistors 22 and 23 to form a voltage Ve which is compared, in the differential amplifier 24-28, with a standard voltage Vref supplied by the standard voltage source 21. When the divided battery voltage Ve is larger than the standard voltage Vref, the output transistors 29 and 30 are turned off to light the light-emitting diode. On the other hand, when the divided battery voltage Ve is smaller than the standard voltage Vref, the output transistors 29 and 30 are rendered conductive to provide, to the output terminal 20, a voltage substantially equal to the positive power supply line voltage, whereby the light-emitting diode is extinguished as the potential difference between the cathode and anode becomes substantially zero. In this manner the battery check operation can be performed by the actuation of the battery check switch S2, without requiring the operation of the power switch S1. On the other hand, the closing of power switch S1 does not cause the lighting of light-emitting diode 17 as the circuit thereof is not completed in this state since battery check switch S2 is open although the battery check circuit 13 itself is functioning.

Figure 3:
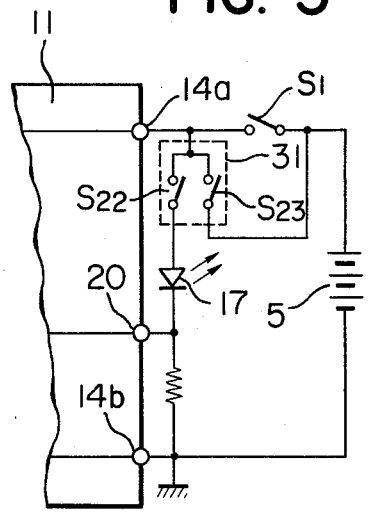
FIG. 3 is a circuit diagram showing a part of a second embodiment of the present invention.

FIG. 3 shows a second embodiment of the present invention, wherein there is provided a single-pole double-circuit switch 31, including therein a battery check switch S22, and a second switch S23 connected parallel to the power switch S1, said battery check switch S22 being connected to the anode of light-emitting diode 17 to form a circuit therefor while said second switch S23 is connected to the anode of battery 5 to constitute a power supply line. Also in this case a similar function as explained in the foregoing can be achieved by one actuation on the single-pole double-circuit switch 31 to simultaneously close the two contacts.

Figure 4:
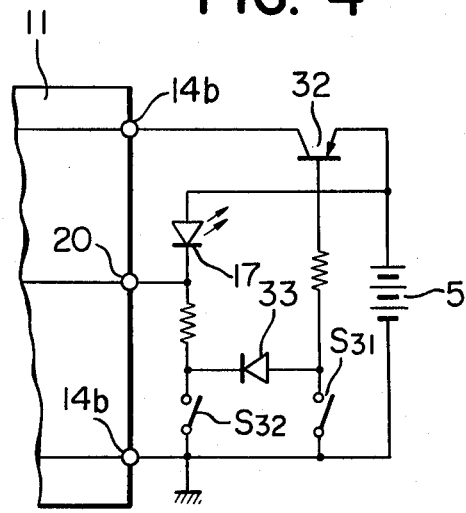
FIG. 4 is a circuit diagram showing a part of a third embodiment of the present invention.

FIG. 4 shows a third embodiment of the present invention. In contrast to the foregoing first and second embodiments which both included a second switching means operating in relation to the battery check switch and connected parallel to the power switch, there is provided, between the power supply terminal 14a and the battery 5, a transistor 32 having its base grounded through the power switch S31 and also through a diode 33 and the battery check switch S32.

In the present embodiment, therefore, the closing of battery check switch S32 renders the transistor 32 conductive irrespective of the state of power switch S31, thereby connecting the light-emitting diode 17 between the power supply lines.

According to the present invention, as explained in the foregoing, the battery check operation is made simpler and achieved by the battery check switch operating alone, even though the power supply terminals for the battery check circuit are in common with those for the main circuits. It is, therefore, possible to reduce the number of external pins used for the power supply terminals when the battery check circuit is incorporated into the integrated circuit of said main circuits.

What I claim is:

1. An apparatus for checking the voltage applied to an electrical circuit on a substrate, the substrate having a pair of terminals for connection to a voltage source for applying voltage to the electrical circuit, comprising power switch means between at least one terminal of the substrate and the voltage source for selectively applying a voltage between the pair of terminals, a battery check circuit on the substrate connected between the pair of terminals for detecting the level of the applied voltage and for providing on a third terminal of the substrate an output signal responsive to said detecting, display means external to the substrate, the display means connected to the third terminal and responsive to the output signal of the battery check circuit for indicating the detected voltage level, and battery check switch means for applying voltage from the voltage source to the display means to actuate the display means, the display means being disabled until actuated by the battery check switch means, and for applying voltage from the voltage source to the pair of terminals independently of the position of the power switch means.

2. An apparatus according to claim 1, wherein the display means comprises a series circuit including a display element, and the battery check switch means comprises a first switch for connecting the series circuit to the voltage applied between the pair of terminals.

3. An apparatus according to claim 2, wherein the battery check switch means includes a second switch in parallel with the power switch means, the second switch being operable with the first switch.

4. An apparatus according to claim 3, wherein the first and second switches comprise mechanical switches linked together.

5. An apparatus according to claim 3, wherein the second switch is a transistor switch rendered conductive by operation of the first switch.

6. An apparatus according to claim 2, wherein the power switch means comprises a transistor switch and a second switch connected to a control terminal of the transistor switch, and wherein the battery check switch means includes means for connecting the control terminal of the transistor switch to the first switch so that the transistor switch is rendered conductive by operation of either the first or the second switches.

7. An apparatus according to claim 1, wherein the electrical circuit and the battery check circuit comprise an integrated circuit on the substrate.

8. An apparatus according to claim 7, wherein the electrical circuit includes a light-measuring circuit and a control circuit for a camera.

* * * * *